(12) United States Patent
Utsugi

(10) Patent No.: US 8,625,923 B2
(45) Date of Patent: Jan. 7, 2014

(54) IMAGE PROCESSING APPARATUS, IMAGING APPARATUS, AND IMAGE PROCESSING PROGRAM

(75) Inventor: Akihiko Utsugi, Machida (JP)

(73) Assignee: Nikon Corporation, Tokyo (JP)

( * ) Notice: Subject to any disclaimer, the term of this patent is extended or adjusted under 35 U.S.C. 154(b) by 241 days.

(21) Appl. No.: 13/043,807

(22) Filed: Mar. 9, 2011

(65) Prior Publication Data

US 2011/0255801 A1    Oct. 20, 2011

(30) Foreign Application Priority Data

Mar. 15, 2010  (JP) ................................. 2010-057934

(51) Int. Cl.
*G06K 9/40* (2006.01)
(52) U.S. Cl.
USPC ......................................................... 382/266
(58) Field of Classification Search
USPC ........... 348/252, 579, 625, E5.052; 358/3.27; 382/199, 254, 266, 269, 275
See application file for complete search history.

(56) References Cited

U.S. PATENT DOCUMENTS

2008/0037898 A1    2/2008    Nakagata et al.

FOREIGN PATENT DOCUMENTS

| JP | A-2000-322569 | 11/2000 | | |
|---|---|---|---|---|
| JP | A-2008-047950 | 2/2008 | | |
| JP | 2009071714 A | * 4/2009 | ............ | H04N 5/208 |
| JP | A-2009-071714 | 4/2009 | | |
| JP | A-2009-200884 | 9/2009 | | |
| JP | A-2010-212782 | 9/2010 | | |

OTHER PUBLICATIONS

Feb. 28, 2012 Notice of Reasons for Rejection issued in Japanese Patent Application No. 2010-057934 (with translation).

* cited by examiner

*Primary Examiner* — Gregory F Cunningham
(74) *Attorney, Agent, or Firm* — Oliff & Berridge, PLC

(57) ABSTRACT

An image processing apparatus includes an edge emphasizing unit configured to form an edge emphasized image by emphasizing an edge of an input image, a range setting unit configured to set a pixel value range of a target pixel value of a target pixel of the input image based on a pixel value difference between the target pixel value and a neighboring pixel value of a neighboring pixel of the input image, and based on an edge emphasized neighboring pixel value of an edge emphasized neighboring pixel of the edge emphasized image, and a ringing control unit configured to restrict an edge emphasized target pixel value of an edge emphasized target pixel of the edge emphasized image in the pixel value range. The edge emphasized neighboring pixel corresponds to the neighboring pixel position of the input image.

12 Claims, 4 Drawing Sheets

| $D_1$ | $D_{24}$ | $D_{23}$ | $D_{22}$ | $D_{21}$ | $D_{20}$ | $D_{19}$ |
|---|---|---|---|---|---|---|
| $D_2$ | $C_1$ | $C_{16}$ | $C_{15}$ | $C_{14}$ | $C_{13}$ | $D_{18}$ |
| $D_3$ | $C_2$ | $B_1$ | $B_8$ | $B_7$ | $C_{12}$ | $D_{17}$ |
| $D_4$ | $C_3$ | $B_2$ | $A$ | $B_6$ | $C_{11}$ | $D_{16}$ |
| $D_5$ | $C_4$ | $B_3$ | $B_4$ | $B_5$ | $C_{10}$ | $D_{15}$ |
| $D_6$ | $C_5$ | $C_6$ | $C_7$ | $C_8$ | $C_9$ | $D_{14}$ |
| $D_7$ | $D_8$ | $D_9$ | $D_{10}$ | $D_{11}$ | $D_{12}$ | $D_{13}$ |

IMAGE PROCESSING APPARATUS, IMAGING APPARATUS, AND IMAGE PROCESSING PROGRAM

BACKGROUND

1. Field of the Invention

The present invention generally relates to an image processing apparatus, an imaging apparatus, and an image processing program.

Priority is claimed on Japanese Patent Application No. 2010-057934, filed Mar. 15, 2010, the content of which is incorporated herein by reference.

2. Description of the Related Art

For image forming apparatuses such as digital cameras, an edge emphasizing process is performed for improving sharpness of photographed images. In some cases, the edge emphasizing process causes ringing artifacts around sharpened edges due to undershoot or overshoot effects, degrading the image quality.

To reduce such drawbacks of the edge emphasizing process, Japanese Unexamined Patent Application, First Publication No. 2000-322569 suggested a method that restricts the pixel values of edge emphasized pixels within a range between the maximum and minimum pixel values of non-emphasized neighboring pixels, reducing the ringing artifacts.

However, in some cases, Japanese Unexamined Patent Application, First Publication No. 2000-322569 provides insufficient improvement of the sharpness of images due to over restrictions on the edge emphasizing process.

SUMMARY

An object of an aspect of the present invention is to provide an image processing apparatus, an imaging apparatus and an image processing program, which improve the sharpness of images, reducing ringing artifacts.

In accordance with an image processing apparatus includes an edge emphasizing unit configured to form an edge emphasized image by emphasizing an edge of an input image, a range setting unit configured to set a pixel value range of a target pixel value of a target pixel of the input image based on a pixel value difference between the target pixel value and a neighboring pixel value of a neighboring pixel of the input image, and based on an edge emphasized neighboring pixel value of an edge emphasized neighboring pixel of the edge emphasized image. The target pixel is positioned at a target pixel position for being processed. The neighboring pixel is positioned at a neighboring pixel position neighboring the target pixel. The edge emphasized neighboring pixel corresponds to the neighboring pixel position of the input image. The image processing apparatus includes a ringing control unit configured to restrict an edge emphasized target pixel value of an edge emphasized target pixel of the edge emphasized image in the pixel value range. The edge emphasized target pixel corresponds to the target pixel position of the input image.

In accordance with another aspect of the present invention, an imaging apparatus includes an image processing apparatus. The image processing apparatus includes an edge emphasizing unit configured to form an edge emphasized image by emphasizing an edge of an input image, a range setting unit configured to set a pixel value range of a target pixel value of a target pixel of the input image based on a pixel value difference between the target pixel value and a neighboring pixel value of a neighboring pixel of the input image, and based on an edge emphasized target pixel value of a edge emphasized target pixel of the edge emphasized image. The target pixel is positioned at a target pixel position for being processed, the neighboring pixel is positioned at a neighboring pixel position neighboring the target pixel, and the edge emphasized neighboring pixel corresponds to the neighboring pixel position of the input image. The image processing apparatus includes a ringing control unit configured to restrict a pixel value of the edge emphasized image in the pixel value range.

In accordance with another aspect of the present invention, a computer-readable recording medium recording a program which causes a computer execute as an image processing apparatus, the program includes emphasizing an edge of an input image and forming an edge emphasized image from the input image, setting a pixel value range of a target pixel value of a target pixel in the input image based on a pixel value difference between the target pixel value and a neighboring pixel value of a neighboring pixel of the input image, and based on an edge emphasized neighboring pixel value of an edge emphasized neighboring pixel of the edge emphasized image. The target pixel is positioned at a target pixel position for being processed, the neighboring pixel is positioned at a neighboring pixel position neighboring the target pixel, and the edge emphasized neighboring pixel corresponds to the neighboring pixel position of the input image. The program includes restricting an edge emphasized target pixel value of an edge emphasized target pixel of the edge emphasized image in the pixel value range. The edge emphasized target pixel corresponds to the target pixel position of the input image.

DESCRIPTION OF EMBODIMENTS

Figure 1:
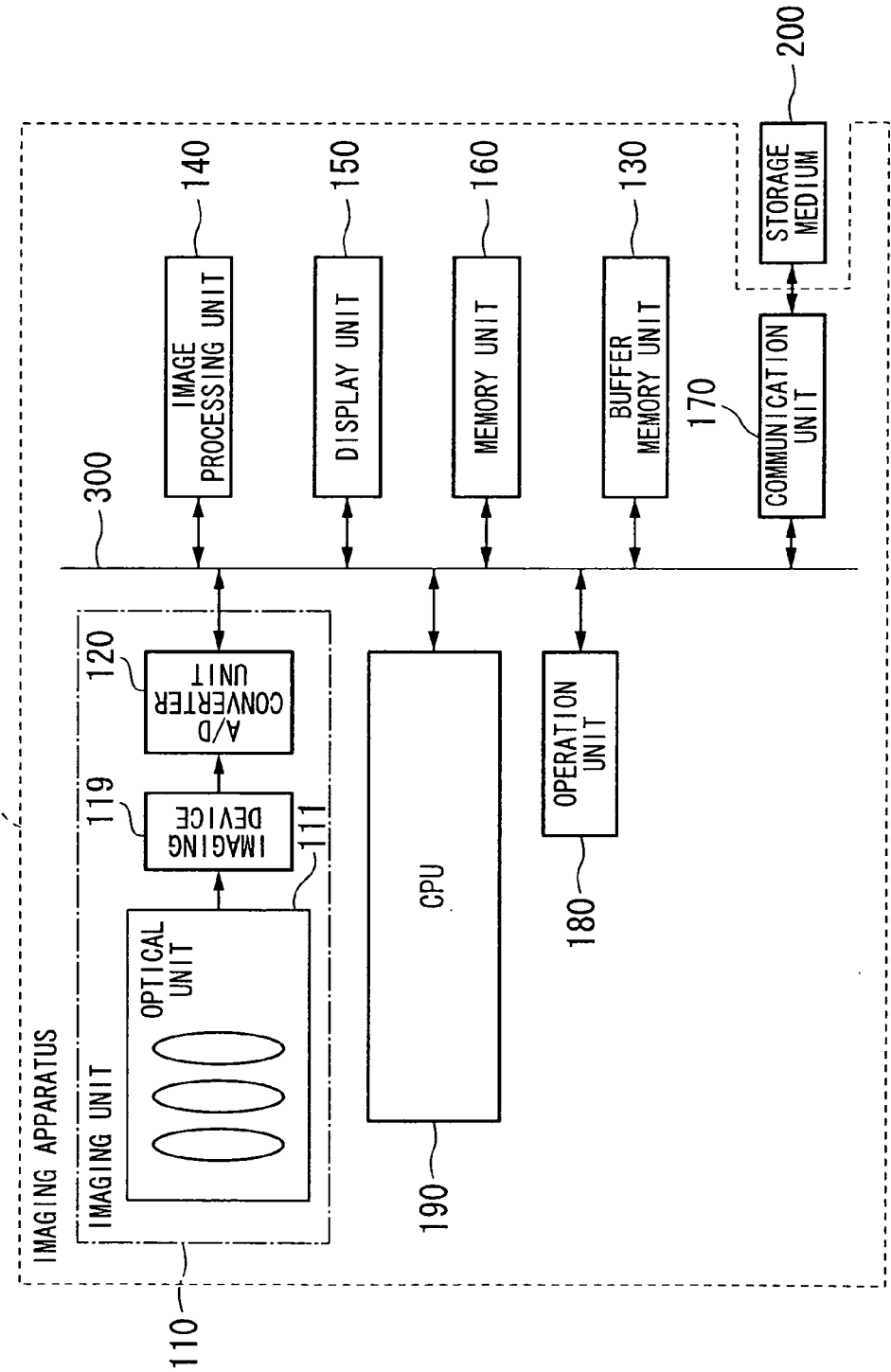
FIG. 1 is a schematic block diagram showing a configuration of an imaging apparatus in accordance with an embodiment of the present invention.

In the following, descriptions of an embodiment according to the present invention will be given with reference to the drawings. FIG. 1 is a schematic block diagram showing a configuration of an imaging apparatus 100 in accordance with an embodiment of the present invention. As is shown in FIG. 1, the imaging apparatus 100 in accordance with the present embodiment includes an imaging unit 110, a CPU (Central Processing Unit) 190, a control unit 180, an image processing unit (or image processing apparatus) 140, a display unit 150, a memory unit 160, a buffer memory unit 130, a communication unit 170, and a bus unit 300.

The imaging unit 110 includes an optical unit 111 having a plurality of lenses, an imaging device 119, and an AD (analog-digital) converter unit 120. The imaging unit 110 is controlled by the CPU 190 based on predetermined imaging conditions, such as iris, exposure value, or the like. The imaging unit 110 forms an optical image on a light receiving part of the imaging device 119 through the optical unit 111. The imaging device 119 of the imaging unit 110 converts the optical image formed on the light receiving part into electronic signals (or electrical signals), and transmits the signals to the A/D converter unit 120. The A/D converter unit 120 converts the electronic signals received from the imaging device 119 into digital signals, thus forming imaging data based on the optical image.

In this case, the optical unit 111 may be installed integrally with the imaging apparatus 100, or the optical unit 111 may be attachable to the imaging apparatus 100.

For example, the imaging device 119 converts an optical image formed on a light receiving part of the imaging device 119 into electrical signals and transmits the electrical signals to the A/D converter unit 120.

Further, the imaging device 119 receives imaging instructions via the operation unit 180. The imaging device 119 stores image data formed according to the imaging instructions to the memory unit 200 as a taken image data of a taken static image via the A/D converter unit 120 or the image processing unit 140.

Furthermore, while the imaging device 119 receives no imaging instructions via the operation unit 180, the imaging device 119 generates continuous multiple image data. The imaging device 119 continuously transmits the continuous multiple image data to the display unit 150 via the A/D converter unit 120 or the image processing unit 140 as through-images (through-image data).

The A/D converter unit 120 performs analog-to-digital conversion (A/D conversion) for electronic signals generated by the imaging device 119, and transmits the converted digital signals as image data to units via the bus unit 300.

The operation unit 180 may include, for example, a power switch, a shutter button, a cross key, a set button, and other operation keys. The operation unit 180 receives operation inputs through user's operations, and transmits the operation inputs to the CPU 190.

The image processing unit 140 performs image processing of image data stored in the buffer memory unit 130 based on image processing conditions stored in the memory unit 160. The image data stored in the buffer memory unit 130 corresponds to an input image data (input image) received by the image processing unit 140. For example, the image data stored in the buffer memory unit 130 correspond to the taken image data such as through-images or image data read from the storage medium 200.

The display unit 150 may be a liquid crystal display, an organic EL (electroluminescence) display monitor, or an electronic ink display (electronic paper display). The display unit 150 displays image (image data) obtained by the imaging unit 110, screen images for operations, or the like.

The memory unit 160 stores judgment conditions refereed by the CPU 190 for judging scenes of images or imaging conditions (parameters).

The buffer memory unit 130 temporary stores image data taken by the imaging unit 110.

The communication unit 170 can be connected to a storage medium that is attachable to the communication unit 170. The storage medium may be, for example, a card memory or the like. The communication unit 170 reads, writes or erases image data of the storage medium.

The storage medium 200 is a memory unit which is attachable to the imaging apparatus 100. For example, the storage medium 200 stores the taken image data generated by the imaging unit 110.

The CPU 190 controls each of units included in the imaging apparatus 100 through the bus unit 300.

The bus unit 300 is connected to the imaging unit 110, the CPU 190, the operation unit 180, the image processing unit 140, the display unit 150, the memory unit 160, the buffer memory unit 130, and the communication unit 170. The bus unit 300 transmits image data or control signals output by each unit to each unit.

Figure 2:
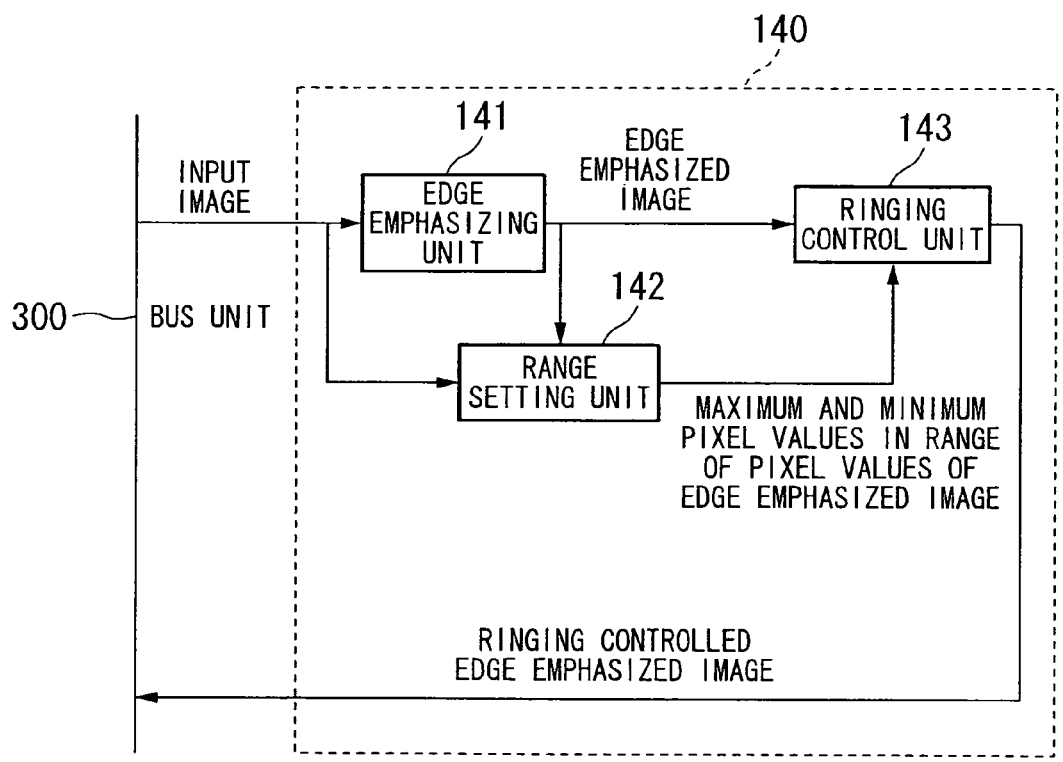
FIG. 2 is a schematic diagram showing a configuration of the image processing unit 140 in FIG. 1.

Further, a configuration of the image processing unit 140 of FIG. 1 will be described by referring FIG. 2. The image processing unit 140 includes an edge emphasizing unit 141, a range setting unit 142, and a ringing control unit 143.

The edge emphasizing unit 141 performs an edge emphasizing process of an input image based on a predetermined data processing, and generates an edge emphasized image. For example, the edge emphasizing unit 141 emphasizes the edges of an input image by applying superposition of a predetermined Laplacian filter to the input image, and generates an edge emphasized image.

The range setting unit 142 sets a maximum pixel value and a minimum pixel value of the edge emphasized image generated by the edge emphasizing unit 141. For example, the range setting unit 142 sets the range of a pixel value of a pixel to be processed (a target pixel: a pixel to be performed by an edge emphasizing process), based on a difference between the pixel value of the target pixel of an input image and a pixel value of a pixel neighboring (a target neighboring pixel) the target pixel, and based on a pixel value of a neighboring pixel of an emphasized image. A pixel which is processed by the edge emphasizing process may be referred to as a target pixel. A pixel located at a particular position of an image which the image processing is performed may be referred to as a to-be-processed pixel. A pixel value of the to-be-processed pixel may be referred to as a processed pixel value. Furthermore, a pixel which neighbors the to-be-processed pixel may be referred to as a neighboring pixel. Also, a pixel value of the to-be-edge emphasized neighboring pixel may be referred to as an edge emphasized neighboring pixel value.

Figures 3A, 3B:
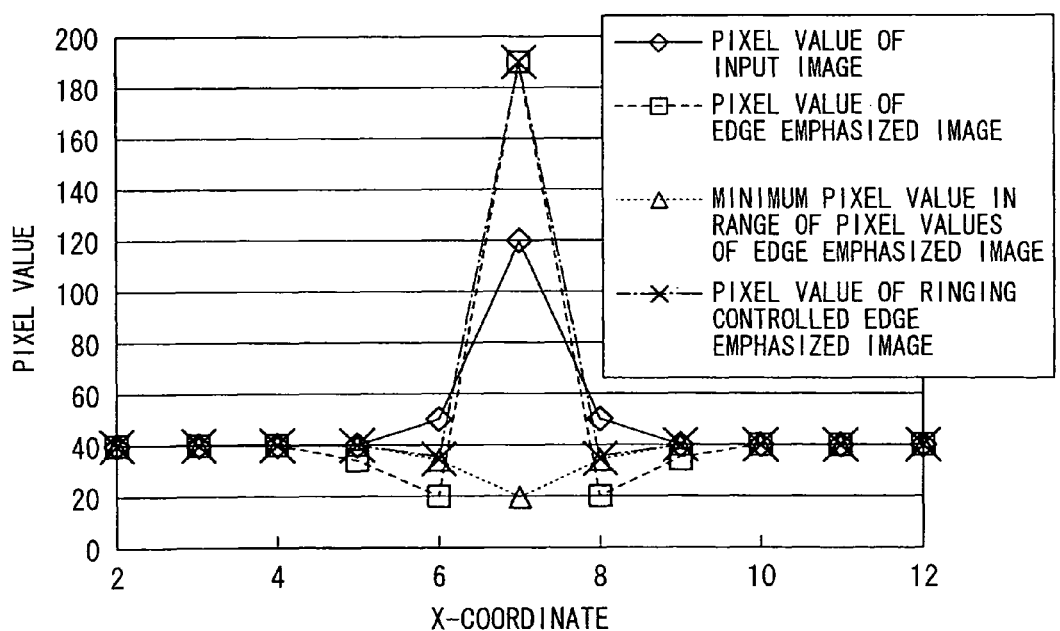
FIG. 3A is a schematic diagram showing an example of a mesh showing an example of relative positions between first neighboring positions of first neighboring pixels and a position "A" of a to-be-processed pixel (target pixel A)
FIG. 3B is a schematic diagram for describing an example of an image processing executed to a first input image by the image processing unit.

FIG. 3A illustrates a mesh showing an example of relative positions between first neighboring positions of first neighboring pixels and a position "A" of a to-be-processed pixel (target pixel A). In the figure, it shows that neighboring positions are arranged around the position A of the to-be-processed pixel (target pixel A). When the target pixel A position is located at the center of the mesh, each of the first neighboring pixels positions is located at the first nearest upper left (B1), at the first nearest left (B2), at the first nearest lower left (B3), at the first nearest bottom (B4), the first nearest lower right (B5), the first nearest right (B6), the first nearest upper right (B7), and the first nearest top (B8). The pixels positioning at B1 through B8 may be referred to as the first neighboring pixels or the neighboring pixels. Furthermore, the second neighboring pixels of the target pixel A may be defined as C1, C2, . . . , C16 as indicated in the figure. The third neighboring pixels of the target pixel A may be defined as D1, D2, . . . , D24 as indicated in the figure. For example, the first neighboring pixels positioning at positions at B1 through B8 may be referred to as the first neighboring pixels. The neighboring pixels positioning at positions at C1 through C16 may be referred to as the second neighboring pixels. The neighboring pixels positioning at positions at D1 through D24 may be referred to as the third neighboring pixels. In other words, "pixel positions of pixels nearest neighboring the target pixel" correspond to the first neighboring positions of the target pixel. In this case, the first neighboring positions are adjacent to each other as shown in FIG. 3A. In the following, descriptions will be given for a case of the first neighboring positions and first neighboring pixels in accordance with the present embodiment.

The ringing control unit 143 sets each pixel value of an edge emphasized image generated by the edge emphasizing unit 141 within a pixel value range between a maximum pixel value and a minimum pixel value determined by the range setting unit 142. Thereby, the ringing control unit 143 restricts pixel values of target pixels (edge emphasized target pixels) of an edge emphasized image within the pixel value range, and generates a ringing controlled edge emphasized image, whose ringing effect is reduced. In other words, the ringing control unit 143 limits the pixel values of target pixels within a range, and generates a ringing controlled edge emphasized image.

For example, when the pixel values of edge emphasized target pixels of an edge emphasized image exceed either a maximum pixel value or a minimum pixel value, the ringing control unit 143 modifies the exceeded pixel values of the edge emphasized target pixels into pixel values in a range. In one example, when a pixel value of an edge emphasized image is equal to or greater than a maximum pixel value, the ringing control unit 143 outputs the maximum pixel value. When the pixel value of the edge emphasized image is equal to or smaller than a minimum pixel value, the ringing control unit 143 outputs the minimum pixel value, otherwise the ringing control unit 143 outputs the pixel value with no modification.

Further, the range setting unit 142 will be described as follows.

When a pixel value (target pixel value) of a target pixel of an input image is equal to or greater than a neighboring pixel value of the input image, the range setting unit 142 sets a neighboring pixel value (an edge emphasized neighboring pixel value) of an edge emphasized image to be a minimum pixel value of the edge emphasized image.

Further, when the target pixel value of the input image is smaller than the neighboring pixel value of the input image, the range setting unit 142 sets the edge emphasized neighboring pixel value of the edge emphasized image to be a maximum pixel value of the edge emphasized image.

When the target pixel value of the input image is equal to or greater than the neighboring pixel value of the input image, the range setting unit 142 executes an addition between the edge emphasized neighboring pixel value of the edge emphasized image and a value obtained by a multiplication between a predetermined constant and a difference between the target pixel value of the input image and the neighboring pixel value of the input image, and then the range setting unit 142 sets the added value to be a maximum pixel value of the edge emphasized image.

Further, when the target pixel value of the input image is smaller than the neighboring pixel value of the input image, the range setting unit 142 obtains a subtraction between the edge emphasized neighboring pixel value of the edge emphasized image and a value obtained by multiplying a predetermined constant (value) and a difference between the target pixel value of the input image and the neighboring pixel value of the input image, and then the range setting unit 142 sets the subtracted value to be a minimum pixel value of the pixel value range of the edge emphasized image.

Further, the range setting unit 142 obtains minimum pixel values of a pixel value range of an edge emphasized image respectively corresponding to plural neighboring pixels of a target pixel. The range setting unit 142 sets the greatest value in the obtained minimum pixel values to be a minimum pixel value of the pixel value range of the edge emphasized image.

A plurality of pixels neighboring the target pixel may be referred to as plural neighboring pixels of the target pixel.

Further, the range setting unit 142 obtains maximum pixel values of the pixel value range of an edge emphasized image respectively corresponding to the plural neighboring pixels of the target pixel. The range setting unit 142 sets the smallest value in the obtained maximum pixel values to be a maximum pixel value of the pixel value range of the edge emphasized image.

The range setting unit 142 restricts the maximum pixel value of the edge emphasized image to be equal or greater than a target pixel value of an input image.

Further, the range setting unit 142 restricts a minimum pixel value of an edge emphasized image to be equal to or less than a target pixel value of an input image.

An example of operations of the range setting unit 142 will now be described. In this case, a pixel position of a to-be-processed pixel (target pixel) is indicated as a pixel position A (a target pixel position A), and a pixel position neighboring the to-be-processed pixel is indicated as a pixel position B. This will describe a case where the range setting unit 142 sets a range of the target pixel value for the pixel position A.

The range setting unit 142 sets an edge emphasized range for each of pixel poisons A in an image.

(Step 1)

The range setting unit 142 determines pixel positions B for pixel positions A in the image. In this case (the first neighboring pixels of the pixel position A), the pixel positions B correspond to eight positions of the neighboring positions B1 through B8 as indicated in FIG. 3A.

(step 2)

This step is used obtain a pixel value difference $\Delta I$ based on equation (1), $$\Delta I = I(A) - I(B) \tag{1}$$

where a pixel value (a target pixel value) of the pixel position A is indicated as I(A), and a pixel value (a neighboring pixel value) of each of the pixel positions B of the input image is indicated as I(B).

(Step 3)

A candidate pixel value for determining a maximum pixel value of the edge emphasized image is given for the following cases.

When the pixel value difference $\Delta I$ is negative ($\Delta I < 0$), $$I_{max} = I_{edg}(B) \tag{2}$$

where $I_{max}$ is a candidate pixel value for a maximum pixel value, $I_{edg}(B)$ is a pixel value of the pixel position B (edge emphasized neighboring pixel) of the edge emphasized image.

When the pixel value difference $\Delta I$ is equal to or greater than zero ($\Delta I \geq 0$), $$I_{max} = I_{edg}(B) + \alpha \cdot \Delta I \tag{3}$$

where $\alpha$ corresponds to a predetermined value, ranging from 2 to 8 ($2 \leq \alpha \leq 8$).

(Step 4)

A candidate pixel value for determining a minimum pixel value of the edge emphasized image is given for the following cases.

When the pixel value difference $\Delta I$ is equal to or greater than zero ($\Delta I \geq 0$), $$I_{min} = I_{edg}(B) \tag{4}$$

where $I_{min}$ is the candidate pixel value of the minimum pixel value.

When the pixel value difference ΔI is negative (ΔI<0), $$I_{min} = I_{edg}(B) + \beta \cdot |\Delta I| \quad (5)$$

where β corresponds to a predetermined value, ranging from 2 to 8 (2≤β≤8).

(Step 5)

The procedures of the steps 1 through 4 are repeatedly performed for respective eight positions of the neighboring positions B: B1 through B8 in FIG. 3A, resulting eight candidate pixel values for the maximum pixel value and eight candidate pixel values for the minimum pixel value, respectively. Further, the smallest pixel value in the eight candidate pixel values for the maximum pixel value is chosen as a tentative maximum pixel value $I_{max\_ten}$. The greatest pixel value in the eight candidate pixel values for the minimum pixel value is chosen as a tentative minimum pixel value $I_{min\_ten}$.

(Step 6)

The maximum pixel value of the edge emphasized image at the pixel position A is determined by equation (6).

When the tentative maximum pixel value ($I_{max\_temp}$) is smaller than the pixel value (I (A)) of the input image at the pixel position A ($I_{max\_ten}$<I(A)), the maximum pixel value of the edge emphasized image is given as follows:

$$I(A)_{max} = I(A) \quad (6)$$

where $I(A)_{max}$ is a maximum pixel value of the edge emphasized image at the pixel position A, and I(A) is a pixel value at the pixel position A of the input image.

Further, when the tentative maximum pixel value is greater than the pixel value of the input image at the pixel position A ($I_{max\_ten}$>I(A)), the maximum pixel value of the edge emphasized image is given as follows:

$$I_{edg}(A) = I_{max\_ten} \quad (7)$$

where $I_{edg}(A)$ is the maximum pixel value of the edge emphasized image at the pixel position A.

(Step 7)

Further, a minimum pixel value of the edge emphasized image at the pixel position A is given as follows.

When the tentative minimum pixel value $I_{min\_ten}$ is greater than the pixel value I(A) at the pixel position A of the input image, ($I_{min\_ten}$>I(A)), $$I_{min\_edg}(A) = I(A), \quad (8)$$

where $I_{min\_edg}(A)$ is a minimum pixel value at the pixel position A of the edge emphasized image.

Further, when the tentative minimum pixel value $I_{min\_ten}$ is smaller than the pixel value I(A) at the pixel position A of the input image, ($I_{min\_ten}$<I(A)), a minimum pixel value of the edge emphasized image at the pixel position A is given as follows:

$$I_{min\_edg}(A) = I_{min\_ten}. \quad (9)$$

An example of effects of the present embodiment will be described below. An input image corresponds to pixels arranged in X and Y coordinates. An explanation is now given for a case where a vertical line parallel is drawn in the plane of the X and Y coordinates at a pixel position x=7 as an input image, and the vertical line of the input image is processed by an edge emphasizing process. In this case, the vertical line is perpendicular to the x axis of the X coordinate and parallel to the y axis of the Y coordinate.

First Example

FIG. 3B is a diagram for describing an effect obtained by the image processing unit 140. In the figure, the lateral axis indicates a pixel position x of the X coordinate and the vertical axis indicates pixel values. Diamond symbols indicate pixel values of the input image. In this case, the vertical line is drawn as an input image at pixel positions x=7 parallel to the y axis. In other words, FIG. 3B indicates a case where a cross section of a vertical line drawn along the y axis at x=7 is indicated by horizontal pixels perpendicularly crossing the vertical line, in which the horizontal pixels are arranged along the x axis. In the figure, squared symbols indicate pixel values of an edge emphasized image of the input image, where the pixel value of the vertical line at the pixel position x=7 is edge-emphasized, while a ringing effect is seen for pixels at pixel positions x=6 and x=8.

A ringing reducing effect obtained at the pixel position x=6 will be described below. In step 6, the range setting unit 142 sets "a maximum pixel value of edge emphasized pixel values≥a pixel value of an unprocessed pixel value (a pixel value of the input image)" as the range of pixel value. The unprocessed pixel value is a pixel value which has not been processed by the edge-emphasized process. On the other hand, at the pixel position x=6 of FIG. 3B, the range setting unit 142 sets that "a pixel value of an input image>a pixel value of an edge emphasized pixel." Thus, at the pixel position x=6, the ringing control unit 143 avoids to restrict an edge emphasized pixel value with a maximum pixel value, in other words, the edge emphasized pixel value does not exceed the maximum pixel value. Further, descriptions will be given for a minimum pixel value at x=6.

When supposed that a pixel position A (a target pixel) is set at the pixel position x=6, three x pixel positions can be neighboring pixel positions B of the pixel position A (See FIG. 3A). Namely, pixel positions B1 (upper left side), B2 (left side), and B3 (lower left side) correspond to the pixel position x=5, pixel positions B8 (upper side) and B4 (lower side) correspond to the pixel position x=6, and positions B7 (upper right side), B6 (right side), and B5 (lower right side) correspond to the pixel position x=7. In this manner, three pixel values become candidate pixel values for a minimum pixel value $I_{min}$.

Further, when supposed that the pixel position x=5 is set as the pixel position B to the pixel position A (x=6), a pixel value I(5) at the pixel position B is smaller than a pixel value I(6) at the pixel position A before the edge emphasized process is performed, so that the range setting unit 142 performs a process of step 4, resulting in the candidate pixel value of the minimum pixel value $I_{min\_can}$ equaling $I_{edg}(5)$, that is, $I_{min\_can} = I_{edg}(5)$.

When the pixel position x=6 is set as the pixel position B of the pixel position A, the pixel value of the pixel position A, I(A), is expressed by I(6), i.e., I(A)=I(6). Then, the pixel value at a pixel position B is expressed by I(B), I(B)=I(6). As both values are the same, the candidate pixel value of the minimum pixel value $I_{min\_can}$ is expressed as follows:

$$I_{min\_can} = I_{edg}(6),$$

where $I_{edg}(6)$ is a pixel value obtained after performing the edge-emphasized process at a position x=6.

When supposed that a position x=7 is set as a pixel position B of the pixel position A (x=6), a difference between a pixel value at the pixel position A and the pixel value at the pixel position B, I(6)−I(7) becomes a great negative value, where the edge emphasizing process is not performed for the pixel value at the pixel position A. As the negative value is multiplied by a predetermined constant and added to a pixel value $I_{edg}(7)$, a candidate pixel value for a minimum pixel value becomes a small value.

For the three candidate for minimum pixel values, as the pixel value at x=5 is processed by the edge emphasized process, $I_{edg}(5)$ indicates the greatest pixel value, the range setting unit 142 determines $I_{edg}(5)$ to be $I_{min}$, i.e., $I_{min}=I_{edg}(5)$, which is indicated by a triangle symbol at the pixel position x=6 in FIG. 3B.

Further, the ringing control unit 143 sets the determined $I_{min}$ to be a minimum pixel value of an edge emphasized pixel value. As a result, the ringing effect is reduced, which can be seen in FIG. 3B as indicated by an "x" symbol at x=6.

Next, descriptions will be given for a case where an edge emphasized effect of the vertical line is not reduced at the pixel position x=7.

In this case, the range setting unit 142 sets a range of pixel values to be "a minimum pixel value of edge emphasized pixels≤unprocessed pixel values (pixel values of an input image). On the other hand, in FIG. 4, it is indicated at the pixel position x=7 that "unprocessed pixel values (diamond symbol) are less than edge emphasized pixel values (square symbol)." Thus, in this case, the edge emphasized pixel value at the pixel position x=7 is not controlled by the minimum pixel value determined by the ringing control unit 143. In other words, the edge emphasized pixel value at x=7 cannot be a pixel value to be smaller than the minimum pixel value. Next, descriptions will be given for a maximum pixel value at the pixel position x=7.

When a pixel position A set at the pixel position x=7, there are three neighboring pixels B respectively corresponding to the pixel position x=6 (corresponding to upper left side pixel (B1), left side pixel (B2) and lower left side pixel (B3)), the pixel position x=7 (corresponding to upper side pixel (B8) and lower side pixel (B4)), and the pixel position x=8 (corresponding to upper right side pixel (B7), right side pixel (B6), and lower side pixel (B5)). Thus, three candidate pixel values exist for a maximum pixel value.

When the pixel positions x=6 and x=8 are set as pixel positions B against the pixel position A (position x=7), the difference between an input pixel value at the pixel position A and the pixel values at the pixel positions B becomes a great positive value. Then, the positive value is multiplied by some number and the result is added to a candidate pixel value for a maximum pixel value, so that the obtained candidate pixel value becomes a great value. For a pixel position B at x=7 to the pixel position A (position x=7), the pixel value at the pixel position A and the pixel value of the pixel position B at x=7 become the same, so that the candidate pixel value for the maximum pixel value becomes an edge emphasized pixel value at the pixel position x=7.

For three candidate pixel values at pixel positions B at x=6, x=8, and x=7, the pixel value of the edge emphasized pixel value at the pixel position x=7, $I_{edg}(7)$, indicates the smallest value, so that, the pixel value of the edge emphasized pixel value at x=7 is determined as the maximum pixel value by the range setting unit 142, i.e., $I_{max}=I_{edg}(7)$.

In this way, the ringing control unit 143 limits edge emphasized pixel values within the determined maximum pixel value. On the other hand, the determined maximum pixel value $I_{max}$ and the edge emphasized pixel value at the pixel position x=7, $I_{edg}(7)$, are the same, then, the edge emphasized pixel value at the pixel position x=7, $I_{edg}(7)$ is not limited by the determined maximum pixel value by the ringing control unit 143. Even if the edge emphasized pixel value $I_{edg}(7)$ is controlled by the ringing control unit 143, the pixel value performed by the edge emphasizing process remains the same pixel value as the edge emphasized pixel value at the pixel position x=7.

For further example, a desirable effect obtained at the pixel position x=5 will be described below. The range setting unit 142 sets a range of pixel values as "the minimum pixel value of the edge emphasized pixel value≤pixel values of an input image≤the maximum pixel value of the edge emphasized pixel value (not shown in the figure)," that is, $I_{min\_edg} \le I(A) \le I_{max\_edg}$. On the other hand, in FIG. 3B, a pixel value of an input image is nearly equal to an edge emphasized pixel value at the pixel position x=6, which can be expressed as $I(5)=I_{edg}$. In this case, the following relation is almost established at the pixel position x=6: the minimum pixel value of edge emphasized pixels≤edge emphasized pixel values≤the maximum pixel value of edge emphasized pixels (not shown in the figure). Thereby, the ringing control process of the ringing control unit 143 does not influence the pixel value at the pixel position x=5. Basically, as there is no ringing effect caused for the pixel value at the pixel position x=5, a desirable result can be obtained for the pixel at the pixel position x=5.

In FIG. 3B, although the ringing effect of an edge emphasized pixel at the pixel position x=6 is controlled, an edge emphasized pixel value at the pixel position x=7 is not restricted by the maximum pixel value of an edge emphasized pixel at the pixel position x=7. Further, similar to a case of the pixel position x=5, when a pixel value of a pixel which has no ringing effect at the initial condition, the pixel value is not modified by the image processing unit 140. Therefore, the image processing unit 140 can sufficiently improve the sharpness of an image while controlling ringing effects.

Second Example

Figure 4:
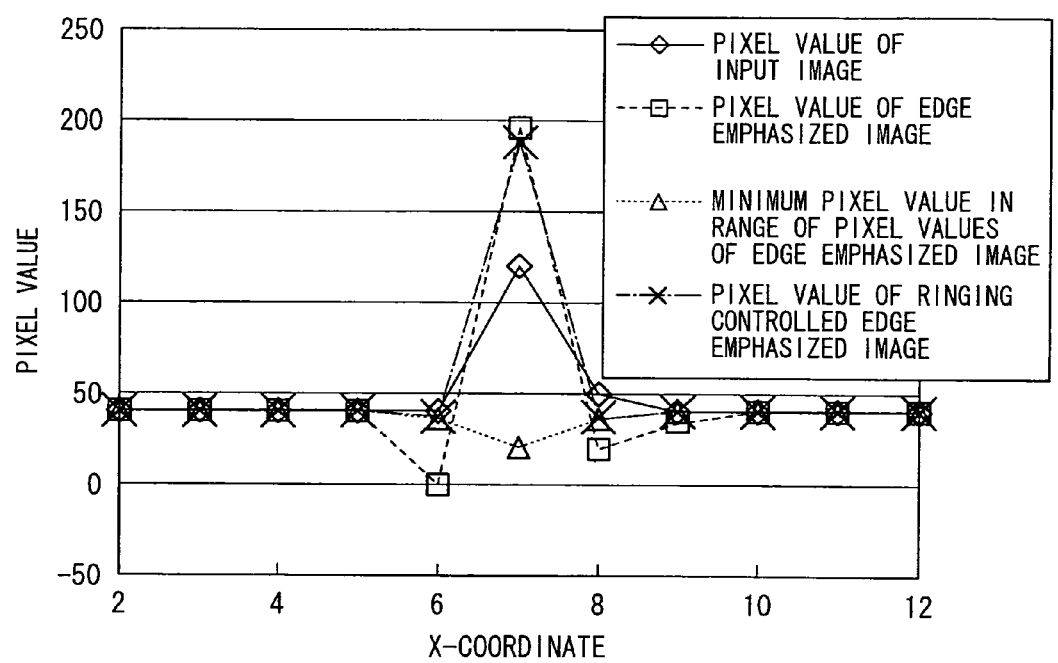
FIG. 4 is a schematic diagram for describing an example of an image processing executed to a second input image by the image processing unit.

Another descriptions will be given for a case where, even if a pixel value $I(6)$ at a pixel position x=6 is slightly smaller than a pixel value $I(5)$ at a pixel position x=5, as shown in FIG. 4, the ringing effect at the pixel position x=6 can be controlled. For example, when a construction object at a pixel position x=7 casts a shadow on a pixel at the pixel position x=6, sometimes, it happens that a pixel value of a taken image at the pixel position x=6 is slightly smaller than a pixel value at the pixel position x=5. Thus, $I(6) < I(5)$.

When the pixel position x=5 is located at a pixel position B to a pixel position A at x=6, the pixel value at the pixel position x=6, $I(6)$, is smaller than the pixel value at the pixel position x=5, $I(5)$. Therefore, a candidate pixel value for a minimum pixel value of an edge emphasized pixel at x=6 is calculated based on the above equation (5) by the range setting unit 142.

When the pixel position B is set at the pixel position x=5, a candidate pixel value for a minimum pixel value $I_{min}(5)$ is expressed as follows:

$$I_{min}(5) = I_{edg}(5) + \gamma \cdot \{I(6) - I(6)\} \quad (10)$$

where $I_{edg}(5)$ is a pixel value of an edge emphasized pixel at the pixel position x=5, γ is a predetermined constant, $I(6)$ is a pixel value of an input image pixel (unprocessed edge emphasized pixel) at the pixel position x=6, and $I(5)$ is a pixel value of an input image pixel at the pixel position x=5.

In this case, as the pixel value $I(6)$ at a pixel value x=6 and the pixel value $I(5)$ at the pixel position x=5 are similar, a candidate pixel value for a minimum pixel value at the pixel position x=5 corresponding to a pixel position B, $I_{Bmin}(5)$, is almost the same as an edge emphasized pixel value at the pixel position x=5, $I_{edg}(5)$. Thus, $I_{Bmin}(5) \approx I_{edg}(5)$. For a case where a pixel position B is located at the pixel position x=6 or x=7, similarly to the case of FIG. 3B, a minimum pixel value is obtained from the maximum pixel value of candidate pixel values for a minimum pixel value, corresponding to an edge emphasized pixel value at the pixel position x=5.

Therefore, the rang setting unit 142 determines the edge emphasized pixel value at the pixel position x=5, which is a maximum pixel value in the candidate pixel values for a minimum pixel value, as the minimum pixel value (triangle symbol Δ). See the triangle symbol at the position x=6 in FIG. 4.

Then, the ringing control unit 143 restricts the pixel value at the pixel position x=5, which is indicated with a square symbol, by use of the determined minimum pixel value (triangle symbol), so that a ringing effect is controlled.

Therefore, even though a pixel value of an input image at the pixel position x=6 is slightly smaller than that at the pixel position x=5 as shown in FIG. 4, the image processing unit 140 reduces a ringing effect of an edge emphasized image at the pixel position x=6. Further, similarly to the case of FIG. 3B, the image processing unit 140 does not restrict an edge emphasized pixel value at the pixel position x=7 by a corresponding maximum pixel value. In this way, as well as the case of FIG. 4, even if a pixel value of an input image at the pixel position x=6 is slightly smaller than that at the pixel position at x=5, the image processing unit 140 can reduce a ringing effect while sufficiently improving the sharpness of an image.

As is described referring FIGS. 3B and 4, the image processing unit 140 in accordance with the present embodiment can reduce the ringing effect while sufficiently improving the sharpness of an image independent of an input image.

Another Example of an Embodiment

In the example given above, although a case where a pixel position A and a pixel position B are adjacent each other is explained, the present embodiment is not limited to the example. For example, the image processing unit 140 may perform a similar image processing by setting other pixels located within the second neighboring pixel positions as neighboring pixels B for the pixel position A.

Namely, the "neighboring pixel positions of a pixel to be processed" described above are not limited to the first neighboring positions. As is seen in FIG. 3A, the second neighboring positions, the third neighboring positions, . . . , or the N-th neighboring positions (N is equal to or greater than 2) may be applied as the "neighboring pixel positions of a pixel to be processed." In this manner, the image processing unit 140 can reduce the ringing effect of two pixels wide. N may be modified according to a predetermined parameter of reducing ringing effect as long as N is a finite natural number. N may be a number equal to or less than 10.

Furthermore, the range setting unit 142 may adjust a degree of ringing reduction (control) effect by expanding (expanding modification) or reducing (reducing modification) the range of an edge emphasized pixel value, in which the expanding modification or the reducing modification is performed by adding or subtracting a predetermined bias value from the maximum pixel value and the minimum pixel value.

Namely, the range setting unit 142 may adjust a minimum pixel value by adding or subtracting a predetermined bias value from the minimum pixel value. Further, the range setting unit 142 may adjust a maximum pixel value by adding or subtracting a predetermined bias value from the maximum pixel value.

For example, when performing expanding modification of a minimum pixel value, the range setting unit 142 subtracts a predetermined bias value from the minimum pixel value, and adds a predetermined bias value to a maximum pixel value.

On the other hand, when performing reducing modification of a minimum pixel value, the range setting unit 142 adds a predetermined bias value to the minimum pixel value, and subtracts a predetermined bias value from a maximum pixel value.

In this way, when the range setting unit 142 performs the expanding modification of an edge emphasized pixel range, the ringing effect performed by the ringing control unit 143 is reduced, while the sharpness of an image is improved. On the other hand, when the range setting unit 142 performs the reducing modification of an edge emphasized pixel range, the ringing control effect by the ringing control unit 143 is improved.

In Step 5 of the present embodiment, the minimum value of candidate pixel values for a maximum pixel value is set as a tentative maximum pixel value, and the maximum value of candidate pixel values for a minimum pixel value is set as a tentative minimum pixel value. In stead of them, the second or third minimum value of candidate pixel values for a maximum pixel value may be set as a tentative maximum pixel value, and the second or third maximum value of candidate pixel values for a minimum pixel value may be set as a tentative minimum pixel value. Thereby, it is possible to reduce the ringing effect of general peripheral lines, maintaining reasonable edge emphasizing of fine structures for providing fine textures.

Further, for the present embodiment, Steps 1 through 7 may be performed for an edge emphasized image having restricted pixel values to obtain a second edge emphasized range. Further the edge emphasized image may be limited within a minimum and maximum pixel value of the second edge emphasized range, so that a second edge emphasized image, whose ringing effect is further reduced, can be output. As is described above, by repeating the process steps twice for an image referring a single pixel width, it is possible to reduce the ringing effect applied to two pixels. According to this method, more natural results can be obtained as well as the embodiment example described above.

Further, the process functions of the image processing unit 140 may be achieved by a special purpose hardware, or the image processing unit 140 may be made by assembling a memory device and a CPU. Further the process functions of the image processing unit 140 may be realized by executing a program of the process function of the image processing unit 140 stored in the memory device.

Further, the program for realizing the process functions of the image processing unit 140 of FIG. 1 may be recorded into a computer readable recording medium, so that a computer system reads the program from the recording medium and executes the process steps of the image processing unit 140. In this case, the computer system may include operation systems (OS) and hardware such as peripheral devices or the like.

Furthermore, when the computer system is available to connect to networks such as the internet (WWW system), the computer system may include a home page providing circumstance or a home page displaying circumstance.

Further, the computer readable recording medium may include a movable medium such as a flexible disc, an optical magnetic disc, a read only memory, a CD-ROM, and a storage device such as a hard disk drive built in the computer system. The computer readable recording medium may include transmission lines or the like which can dynamically storage the program for transmitting the program during a brief period of time such as networks of the internet and transmission line of telecommunication. Further, the computer readable recording medium may be dynamic memories included in computer systems such as a server PC or a client PC which stores the program in certain period of time. The program described above may be used as part of another program to achieve part of the functions or a particular part. This can perform the functions by combining the program with other programs which are already recorded in the computer system.

Although the embodiments in accordance with the present invention have been described above with reference to drawings, the specific configurations are not limited to the embodiments, and include modifications of design without departing from the scope of the present invention.

What is claimed is:

1. An image processing apparatus comprising:
   an edge emphasizing unit configured to form an edge emphasized image by emphasizing an edge of an input image;
   a range setting unit configured to set a pixel value range of a target pixel value of a target pixel of the input image based on a pixel value difference between the target pixel value and a neighboring pixel value of a neighboring pixel of the input image, and based on an edge emphasized neighboring pixel value of an edge emphasized neighboring pixel of the edge emphasized image, the target pixel being positioned at a target pixel position for being processed, the neighboring pixel being positioned at a neighboring pixel position neighboring the target pixel, the edge emphasized neighboring pixel corresponding to the neighboring pixel position of the input image; and
   a ringing control unit configured to restrict an edge emphasized target pixel value of an edge emphasized target pixel of the edge emphasized image in the pixel value range, the edge emphasized target pixel corresponding to the target pixel position of the input image,
   wherein the ringing control unit modifies the edge emphasized target pixel value of the edge emphasized neighboring pixel in the pixel value range when the edge emphasized target pixel value of the edge emphasized pixel is out of the pixel value range.

2. An image processing apparatus comprising:
   an edge emphasizing unit configured to form an edge emphasized image by emphasizing an edge of an input image;
   a range setting unit configured to set a pixel value range of a target pixel value of a target pixel of the input image based on a pixel value difference between the target pixel value and a neighboring pixel value of a neighboring pixel of the input image, and based on an edge emphasized neighboring pixel value of an edge emphasized neighboring pixel of the edge emphasized image, the target pixel being positioned at a target pixel position for being processed, the neighboring pixel being positioned at a neighboring pixel position neighboring the target pixel, the edge emphasized neighboring pixel corresponding to the neighboring pixel position of the input image; and
   a ringing control unit configured to restrict an edge emphasized target pixel value of an edge emphasized target pixel of the edge emphasized image in the pixel value range, the edge emphasized target pixel corresponding to the target pixel position of the input image,
   wherein the range setting unit sets the edge emphasized neighboring pixel value as a minimum pixel value of the pixel value range when the target pixel value of the input image is equal to or greater than the neighboring pixel value.

3. An image processing apparatus comprising:
   an edge emphasizing unit configured to form an edge emphasized image by emphasizing an edge of an input image;
   a range setting unit configured to set a pixel value range of a target pixel value of a target pixel of the input image based on a pixel value difference between the target pixel value and a neighboring pixel value of a neighboring pixel of the input image, and based on an edge emphasized neighboring pixel value of an edge emphasized neighboring pixel of the edge emphasized image, the target pixel being positioned at a target pixel position for being processed, the neighboring pixel being positioned at a neighboring pixel position neighboring the target pixel, the edge emphasized neighboring pixel corresponding to the neighboring pixel position of the input image; and
   a ringing control unit configured to restrict an edge emphasized target pixel value of an edge emphasized target pixel of the edge emphasized image in the pixel value range, the edge emphasized target pixel corresponding to the target pixel position of the input image,
   wherein the range setting unit sets the edge emphasized neighboring pixel value as a maximum pixel value of the pixel value range when the target pixel value is less than the neighboring pixel value.

4. An image processing apparatus comprising:
   an edge emphasizing unit configured to form an edge emphasized image by emphasizing an edge of an input image;
   a range setting unit configured to set a pixel value range of a target pixel value of a target pixel of the input image based on a pixel value difference between the target pixel value and a neighboring pixel value of a neighboring pixel of the input image, and based on an edge emphasized neighboring pixel value of an edge emphasized neighboring pixel of the edge emphasized image, the target pixel being positioned at a target pixel position for being processed, the neighboring pixel being positioned at a neighboring pixel position neighboring the target pixel, the edge emphasized neighboring pixel corresponding to the neighboring pixel position of the input image; and
   a ringing control unit configured to restrict an edge emphasized target pixel value of an edge emphasized target pixel of the edge emphasized image in the pixel value range, the edge emphasized target pixel corresponding to the target pixel position of the input image,
   wherein the range setting unit sets a pixel value obtained by addition of the edge emphasized neighboring pixel value and a multiplied value as a maximum pixel value in the pixel value range when the target pixel value is equal to or greater than the neighboring pixel value, the multiplied value is obtained by multiplication of a predetermined value by the pixel value difference between the target pixel value and the neighboring pixel value.

5. An image processing apparatus comprising:
   an edge emphasizing unit configured to form an edge emphasized image by emphasizing an edge of an input image;
   a range setting unit configured to set a pixel value range of a target pixel value of a target pixel of the input image based on a pixel value difference between the target pixel value and a neighboring pixel value of a neighboring pixel of the input image, and based on an edge emphasized neighboring pixel value of an edge emphasized neighboring pixel of the edge emphasized image, the target pixel being positioned at a target pixel position for being processed, the neighboring pixel being positioned at a neighboring pixel position neighboring the target pixel, the edge emphasized neighboring pixel corresponding to the neighboring pixel position of the input image; and a ringing control unit configured to restrict an edge emphasized target pixel value of an edge emphasized target pixel of the edge emphasized image in the pixel value range, the edge emphasized target pixel corresponding to the target pixel position of the input image, wherein when the target pixel value is less than the neighboring pixel value, the range setting unit sets a pixel value obtained by subtraction of the edge emphasized neighboring pixel value and a multiplied value obtained by multiplication of a predetermined value by the pixel value difference as a minimum pixel value in the pixel value range.

6. The image processing apparatus as claimed in claim 2, wherein the range setting unit obtains minimum pixel values from respective pixel value ranges of plural neighboring pixels of the target pixel, and determines a first maximum pixel value, a second maximum pixel value and a third maximum pixel value of each of the plural neighboring pixels based on the minimum pixel values, so that the range setting unit determines a minimum pixel value of the pixel value range from one of the first maximum, second and third maximum pixel values.

7. The image processing apparatus as claimed in claim 3, wherein the range setting unit obtains minimum pixel values from respective pixel value ranges of plural neighboring pixels of the target pixel, and determines a first maximum pixel value, a second maximum pixel value and a third maximum pixel value of each of the plural neighboring pixels based on the minimum pixel values, so that the range setting unit determines a maximum pixel value of the pixel value range from one of the first maximum, second and third maximum pixel values.

8. The image processing apparatus as claimed in claim 2, wherein the range setting unit restricts the maximum pixel value of the pixel value range to be equal to or greater than the target pixel value of the target pixel of the input image.

9. The image processing apparatus as claimed in claim 3, wherein the range setting unit restricts the minimum pixel value of the pixel value range to be equal to or less than the target pixel value of the target pixel of the input image.

10. The image processing apparatus as claimed in claim 2, wherein the range setting unit modifies the minimum pixel value of the pixel value range by executing addition or subtraction between a predetermined bias value and the minimum pixel value of the pixel value range.

11. The image processing apparatus as claimed in claim 3, wherein the range setting unit modifies the maximum pixel vale of the pixel value range by executing addition or subtraction between a predetermined bias value and the maximum pixel value of the pixel value range.

12. An image processing apparatus comprising:

an edge emphasizing unit configured to form an edge emphasized image by emphasizing an edge of an input image;

a range setting unit configured to set a pixel value range of a target pixel value of a target pixel of the input image based on a pixel value difference between the target pixel value and a neighboring pixel value of a neighboring pixel of the input image, and based on an edge emphasized neighboring pixel value of an edge emphasized neighboring pixel of the edge emphasized image, the target pixel being positioned at a target pixel position for being processed, the neighboring pixel being positioned at a neighboring pixel position neighboring the target pixel, the edge emphasized neighboring pixel corresponding to the neighboring pixel position of the input image; and a ringing control unit configured to restrict an edge emphasized target pixel value of an edge emphasized target pixel of the edge emphasized image in the pixel value range, the edge emphasized target pixel corresponding to the target pixel position of the input image, wherein the edge emphasizing image is restricted by the ringing control unit forming a second edge emphasized image, and the image processing apparatus further comprising:

a second range setting unit configured to set a second edge emphasized range of the target pixel value of the target pixel of the input image based on the pixel value difference between the target pixel value and a neighboring pixel value of a neighboring pixel of the input image, and based on an edge emphasized neighboring pixel value of an edge emphasized neighboring pixel of the second edge emphasized image; and a second ringing control unit configured to restrict an edge emphasized target pixel value of an edge emphasized target pixel value of the second edge emphasized image in the second edge emphasized range.

* * * * *